United States Patent [19]

Gross

[11] Patent Number: 4,700,922

[45] Date of Patent: Oct. 20, 1987

[54] MEDICAL EQUIPMENT MOUNTING APPARATUS

[75] Inventor: James R. Gross, Bartlett, Ill.

[73] Assignee: The Kendall Company, Boston, Mass.

[21] Appl. No.: 684,238

[22] Filed: Dec. 20, 1984

[51] Int. Cl.$^4$ .............................................. F16M 13/00
[52] U.S. Cl. .................................... 248/558; 248/282; 248/DIG. 11
[58] Field of Search ............... 248/282, 283, 276, 278, 248/124, 122, 121, 558, DIG. 11, DIG. 12, 518, 535; 5/503, 508; 403/3, 287, 292; 81/57.36, D11, 439

[56] References Cited

U.S. PATENT DOCUMENTS

| | | | |
|---|---|---|---|
| 92,053 | 6/1869 | Hunter | 248/207 |
| 300,583 | 6/1884 | Drew | 248/282 |
| 2,448,168 | 8/1948 | Banister | 81/439 |
| 3,550,892 | 12/1970 | Propst | 248/282 |

FOREIGN PATENT DOCUMENTS

| | | | |
|---|---|---|---|
| 143590 | 6/1935 | Austria | 248/282 |
| 1406564 | 6/1965 | France | 248/282 |
| 294797 | 11/1953 | Switzerland | 81/D11 |
| 594111 | 11/1947 | United Kingdom | 81/439 |

Primary Examiner—Reinaldo P. Machado
Assistant Examiner—Alvin Chin-Shue
Attorney, Agent, or Firm—Donald N. Halgren

[57] ABSTRACT

Medical equipment mounting apparatus with a plurality of pivotally connected members including a first upright member designed for snug upright support of receipt within a standard IV pole hole, or mounting bracket, of a hospital bed. The equipment is releasibly detachable from the mounting means, and the mounting apparatus itself is releasibly detachable from the bed frame to facilitate its easy use at different bed locations. The pivotal connection between the arms enables 180 degrees of movement in either of two directions between some of the arms, so that the medical equipment can be located alongside the bed frame in parallel relationship therewith. The first upright member has couplers at opposite ends of different diameters for mating receipt within pole holes of different diameters. Alternately, the effective diameter of the first member is selectively altered to fit within different sized IV pole mounting holes.

6 Claims, 3 Drawing Figures

MEDICAL EQUIPMENT MOUNTING APPARATUS

BACKGROUND OF THE INVENTION

This invention relates to medical equipment mounting apparatus and, more particularly, to apparatus for mounting medical equipment to a hospital bed or the like.

It is common practice to mount an IV bag and other like equipment to hooks or arms at the ends of long upright poles to elevate them above the patient for gravity flow purposes. Accordingly, many hospital beds today provide what are referred to as IV pole sockets or mounting holes as an integral part of the bed frames or which are otherwise mounted to the bed frames. Often, there are as many as four of these IV pole mounting holes located at each corner of the bed. Most of these IV pole mounting holes have an internal diameter of approximately 0.5 inch; however, others are known to be as large as 0.75 inch. Accordingly, no single pole can be used universally with all standard IV pole mounting holes.

While these IV pole mounting holes located at the four corners of the bed are suitably located for hanging blood bags and the like which must be located above the patient, they are less suitable for equipment that needs to be mounted at or beneath the level of the patient, such as a urinary collection bag of a catherization kit or automated urinary output monitoring equipment from which a collection bag is supported. Further, the catherization site is normally intermediate the ends of the bed. Accordingly, simple pole mounting of the collection bag and automated urinary output monitoring equipment, at any of the four corners of the bed, does not enable location of the urinary output collection bag directly opposite the catherization site.

SUMMARY OF THE INVENTION

Accordingly, it is a principal object of the present invention to provide an improved medical equipment mounting apparatus for movably mounting medical equipment, such as an automated urine output monitor, to an IV pole mounting hole or other mounting fixture by means of a member received within the IV pole hole and other means for movably mounting the equipment to said first member to enable location of the equipment at different selected locations relative to the bed, such as alongside a bed and opposite a catherization site intermediate the ends of the bed.

In keeping with this objective, in a preferred embodiment of the medical equipment mounting apparatus, a first member is provided for snug, upright supportive receipt within the IV pole mounting hole, a second elongae member, means for mounting the second elongate member to the first member with it extending substantially transversely therefrom, a third elongate member with two ends, means for mounting one end of the third member to the second member for pivotal movement relative thereto and means for mounting the housing to the other end of the third member. Preferably, the second member is mounted to the first member for rotary movement about its axis.

It is also an object of the present invention to provide medical equipment mounting apparatus for selective mounting to standard intravenous pole mounting holes of two different sized diameters. In a preferred embodiment, the mounting apparatus includes a first coupler member with a pair of opposite ends of different diameter for snug receipt within IV pole mounting holes of correspondingly different sized diameters, respectively, and means for mounting the medical equipment to the first member intermediate the pair of opposite ends. In another embodiment, means are provided for selectively altering the effective diameter of the first member so that it may be snugly received within intravenous pole mounting holes of different diameter.

It is a further objective to provide a method of mounting medical equipment to different mounting fixtures by means of mounting apparatus having a mounting member with a pair of different fixture couplers at opposite ends thereof for mated coupling with two different mounting fixtures, comprising the steps of selecting a fixture to which the equipment is to be mounted, selecting which of the pair of couplers will properly mate with the selected fixture and then coupling the selected coupler with the selected fixture. In a preferred embodiment, the mounting apparatus includes means for attaching the mounting member for rotary movement relative to the equipment and includes the step of rotating the mounting member to properly align the selected coupler relative to the selected fixture and the equipment.

BRIEF DESCRIPTION OF THE DRAWING

The foregoing objects, advantages and features will be described in greater detail and other objects and advantageous features will be made apparent from a reading of the following detailed description of the preferred embodiment which is given with reference to the three views of the drawing, in which.

DETAILED DESCRIPTION

Figure 1:
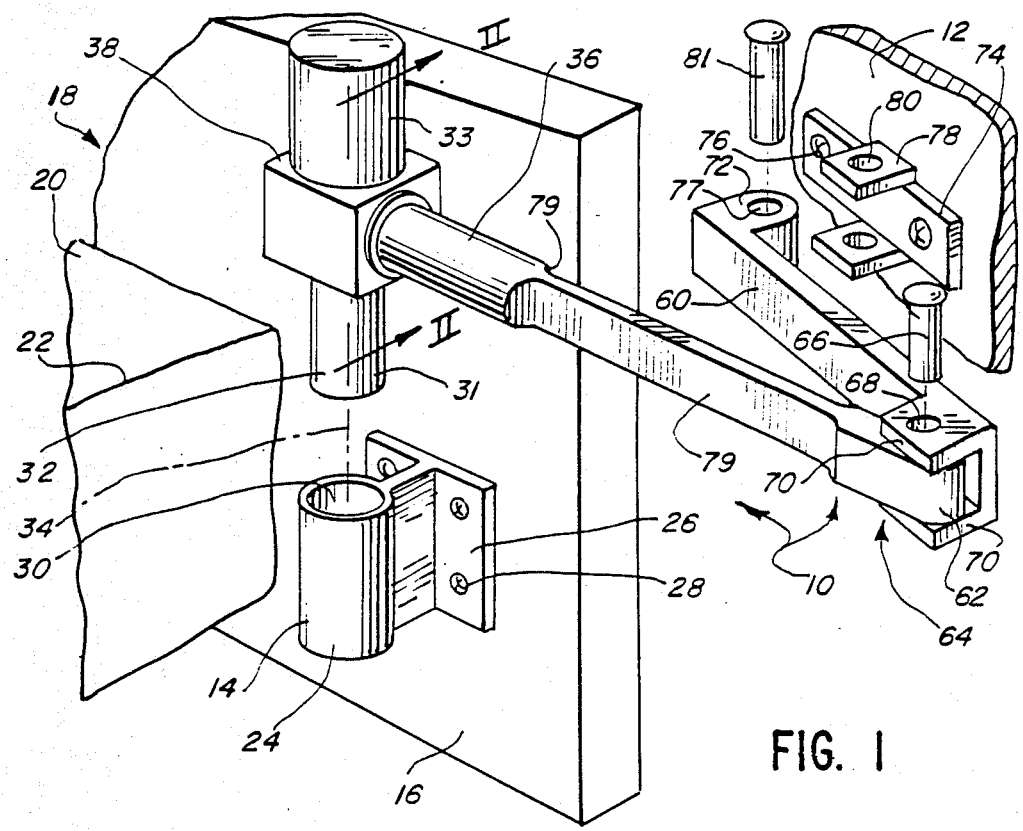
FIG. 1 is a perspective view, partially exploded, of the medical equipment mounting apparatus of the present invention.

Referring now to FIG. 1 of the drawings, the medical equipment mounting apparatus 10 is seen as employed to mount the housing of an item of medical equipment 12 to a standard IV pole socket or mounting hole bracket 14 attached to a frame member 16, such as a headboard, of a bed 18. Bed 18 has a patient support surface such as a mattress 20 with an edge 22 at one side. While the mounting apparatus 10 may be employed to mount various types of medical equipment 12, it is particularly well suited for mounting of an automated urinary output monitor unit at a location opposite the catherization site along the edge 22 of mattress 20 at the approximate level thereof.

The particular IV mounting bracket shown in FIG. 1, has a cylindrical body 24 mounted to frame 16 by means of a mounting member 26 attached to body 24 and fastened to frame 16 by suitable screw fasteners 28. Body 24 has a cylindrical IV pole mounting hole having an elongate axis held in a substantially vertical position by mounting member 26 and is adapted for snugly mated coupling receipt of cylindrical support standards or IV poles used to support IV bags holding blood, nutritional solutions or the like. While a particular IV mounting bracket 14 has been shown, it should be appreciated that any other means providing a suitable IV mounting hole, such as IV mounting hole 30, or other mounting bracket could be employed in its place.

The equipment mounting apparatus 10 includes a first elongate member 31 with a pair of cylindrical couplers 32 and 33 at opposite ends for mated coupling with IV pole mounting holes 30 of different diameter. The coupler 33 has a larger diameter for mating receipt with an IV pole hole larger than that shown in FIG. 1, while the coupler 32 has a smaller diameter for snug, upright supportive receipt within the relatively smaller standard IV pole hole 30 of FIG. 1. Diameters of 0.5 inch and 0.75 inch have been found suitable for couplers 32 and 33, respectively.

While the fit is sufficiently close to insure that adequate lateral support is given to the first member 32 by the cylindrical body 24, it is not so snug that the first elongate cylindrical member 32 cannot rotate therewithin about the common elongate axis 34. Thus, a first degree of rotary movement of the medical equipment housing 12 around axis 34 is provided by the first member 32.

In addition, or alternately, one or both of couplers 32 and 33 are tapered from adjacent the body 40 where the diameter is larger than that of the largest standard IV hole diameter to a diameter at the distal end which is less than that of the smallest standard IV pole mounting hole diameter. In this way, the member 31 is adapted for universal receipt within standard IV holes of more than two different diameters. Alternately, member 32 is provided with means for expanding its diameter from a diameter less than that of the smallest IV hole to a diameter larger than the largest standard IV hole, such as by providing it in the form of an expandible mandrel.

Figure 2:
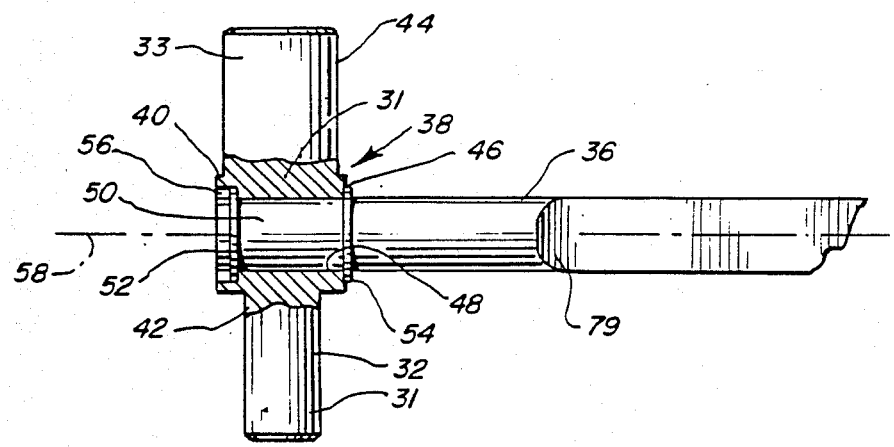
FIG. 2 is a partial sectional view of a portion of the mounting apparatus taken along section line II—II of FIG. 1.

A second elongate member 36 is mounted to member 31 intermediate couplers 32 and 33. This second member 36 is mounted to the first member 31 by means of a rotary mounting assembly 38 which is also shown in FIG. 2. Referring to FIG. 2, the rotary mounting assembly 38 is seen to include an intermediate body 40 of first member 31 with a cylindrical opening 48 extending therethrough in a direction transverse to the elongate axis 34 of the first member 31. A cylindrical portion 50 of the second elongate member 36 is rotatably held therewithin by means of a pair of C-clamps 52 and 54 which are received within suitable mating grooves around the peripheral cylindrical wall of portion 50. C-clamp 52 is preferably protectively contained within a recess 56 in body 40. The C-clamps 54 and 56 releasably retain the cylindrical portion 50 within body 40 while enabling it to rotate along the common central axis 58 of cylindrical portion 50 and cylindrical opening 48 within which it is received.

Thus, rotary mounting assembly 38 enables the selected one of couplers 32 and 33 to be oriented in a downwardly direction relative to the equipment and the fixture 14 for coupling therewith. It also enables the equipment to be pivoted about this rotary axis after the selected coupler has been mounted on the selected IV pole mounting hole.

Referring again to FIG. 1, the mounting apparatus also includes a third elongate member 60 which is pivotally attached to the distal end 62 of the second member 36 by means of a pivotal mounting assembly 64. Pivotal mounting assembly 64 includes an axle pin 66 received in mating engagement within three aligned axle holes 68 (only one shown) extending through the distal end 62 of the second member 36 and a pair of parallel mounting members 70 mounted to the end of the third member 60. The second member 36 and third member 60 thereby lie in a plane and share a common pivot axis which is perpendicular to that plane.

The distal end 72 of the third arm 60 is mounted to equipment housing 12 by means including a bracket 74 fixedly attached to housing 12 by means of suitable screw fasteners 76. The bracket 74 also includes a pair of spaced, parallel connector members 78 having a pair of aligned axle pin receiving holes 80 therein. A boss at the distal end 72 of member 60 is snugly received between the pair of spaced connector members 78 and has an axle pin hole 77 therein for alignment with axle pin holes 80. The bracket 74 and thus housing 12 is pivotally mounting to the distal end 72 of arm 60 when the boss thereat is snugly inserted between the pair of spaced parallel connector members 80 and an axle pin 81 is inserted therethrough. The housing 12 is thereby mounted to the distal end 72 for relative pivotal movement about an axis parallel to that of pin member 66.

An advantageous feature of the mounting apparatus is that the second member 36 has a pair of recessed portions 79 located along its length for receipt of the third member to facilitate the two members to be folded against one another. For this same reason, the pin axle connection at distal end 62 of the second member 36 enables 180 degrees of pivotal movement between the two members on either side.

The housing 12 is releasibly detachable from the distal end of the third member 60 simply by removing pin 81 and separating the pair of parallel connector members from around the boss at the distal end 72 of the third member 60.

Figure 3:
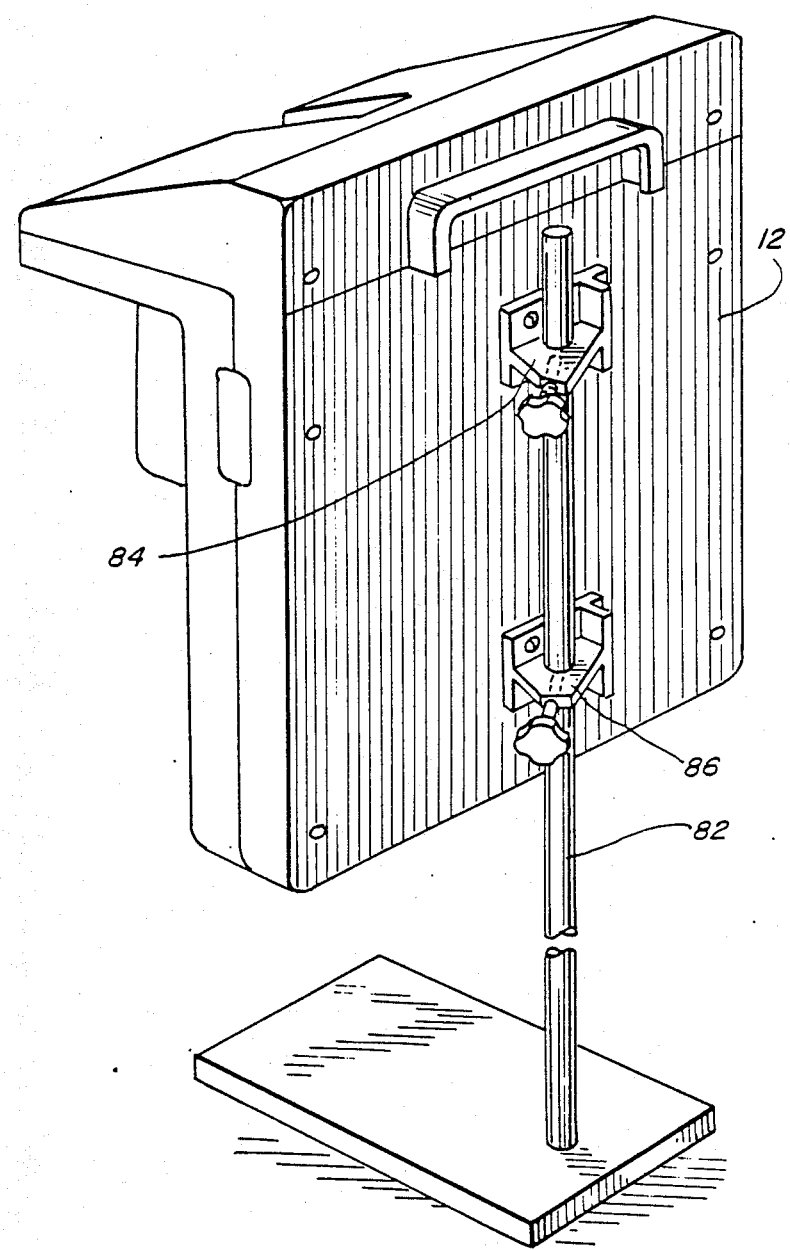
FIG. 3 is a perspective view of another embodiment of the invention.

Alternately, referring to FIG. 3, the housing of equipment 12 and is releasibly mounted to the third elongate member 60 by means of a fourth member 82 receivable in upright supportive engagement within axle pin hole 77 of the third elongate member 60, FIG. 2. The housing of equipment 12 is releasibly attached to the fourth member 80 by means of a pair of screw clamps 84 and 86 fixedly attached to the back of housing 12 and releasibly attached to the fourth member 82. By loosening the screw clamps 84 and 86, the housing may be rotated about or moved along the elongate axis of the fourth member 82. In such case, the fourth elongate member 82 need not be mounted for rotation within pin hole 77, but may be fixedly mounted to the distal end 72 of the third member 60.

Preferably, when the medical equipment comprises a urinary output monitor with means for supporting a fluid collection container, the dimensions of the various members are selected to enable mounting this equipment to the bed at a level adjacent edge. The apparatus also enables mounting the equipment in parallel relationship with the bed.

While a particular preferred embodiment has been disclosed for purposes of illustrating the present invention, it should be appreciated that many variations may be made with regard thereto without departing from the scope of the invention. Instead, the scope of the invention is defined by the following claims.

I claim:

1. Apparatus for mounting medical equipment to standard intravenous pole mounting holes of two different sized diameters, comprising:
    a pivot coupler member having a pair of opposite ends of different diameters for snug receipt of one of said ends at a time within intravenous pole mounting holes of correspondingly different standard sized diameters, respectively, and means for mounting the medical equipment to the coupler member intermediate the pair of opposite ends.

2. The mounting apparatus of claim 1 in which said mounting means includes an elongate member with a pair of opposite ends, means for attaching one of said ends of the elongate member to the coupler member intermediate its opposite ends, and other means for attaching the other of said ends of the elongate member to the equipment.

3. The mounting apparatus of claim 2 in which said other means includes a further elongated member and means for mounting said further elongated member for pivotal movement about an axis perpendicular to the elongate direction of the other elongated member for folding of the further member against either of two opposite sides of the other member.

4. A method of mounting medical equipment to different mounting fixtures by means of mounting apparatus having a mounting member with a pair of different fixture pivot couplers at opposite ends thereof for mated coupling with two different mounting fixtures and means for attaching the medical equipment to the mounting member at a location intermediate said opposite ends, comprising the steps of:

selecting a fixture to which the equipment is to be mounted;

selecting which of the pair of couplers will properly mate with the selected fixture; and coupling the selected coupler with the selected fixture.

5. The method of claim 4 in which said different fixtures are IV pole mounting holes of different diameter, said couplers are cylindrical members of different mating diameters for snug supportive receipt within said IV pole mounting holes of different diameter, and said step of mating coupling comprises mating the selected coupler into its corresponding IV pole mounting hole.

6. The method of claim 4 in which said attaching means includes means for attaching the mounting member to the equipment for relative rotary movement with respect thereto intermediate the pair of couplers, and including the step of rotating the mounting member to properly align the seleted coupler relative to the selected fixture and the equipment.

* * * * *